United States Patent
Maguire et al.

(10) Patent No.: US 9,608,478 B2
(45) Date of Patent: Mar. 28, 2017

(54) AUXILIARY POWER SYSTEM FOR OPTICAL NETWORK TERMINAL

(71) Applicant: Verizon Patent and Licensing Inc., Arlington, VA (US)

(72) Inventors: Thomas Maguire, Long Valley, NJ (US); Vincent O'Byrne, Boston, MA (US); Stanley Jo Wynman, Bogota, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 449 days.

(21) Appl. No.: 14/254,731

(22) Filed: Apr. 16, 2014

(65) Prior Publication Data

US 2015/0303740 A1    Oct. 22, 2015

(51) Int. Cl.
*H02J 9/04*        (2006.01)
*H04Q 11/00*       (2006.01)
*H04B 10/80*       (2013.01)
*H04B 10/40*       (2013.01)
*H04B 10/272*      (2013.01)

(52) U.S. Cl.
CPC .............. *H02J 9/04* (2013.01); *H04B 10/272* (2013.01); *H04B 10/40* (2013.01); *H04B 10/808* (2013.01); *H04Q 11/0067* (2013.01); *H04Q 2011/0079* (2013.01); *Y10T 307/625* (2015.04)

(58) Field of Classification Search
CPC .. H04B 10/808; H04B 10/40; H04Q 11/0067; H04Q 2011/0079; H01M 2/1016; H02J 9/00; H02J 9/04; H02J 9/06; H02J 9/061; Y10T 307/625
See application file for complete search history.

(56) References Cited

U.S. PATENT DOCUMENTS

| | | | | |
|---|---|---|---|---|
| 5,796,639 A | * | 8/1998 | Hall | G06F 11/2289 702/118 |
| 7,277,637 B2 | * | 10/2007 | Jette | H04J 14/02 398/63 |
| 9,049,753 B1 | * | 6/2015 | Wassel | H05B 37/02 |

OTHER PUBLICATIONS

Motorola; Motorola ONT1400GT: Datasheet; 2009.*

* cited by examiner

*Primary Examiner* — Ryan Johnson (57) ABSTRACT

A system is provided for powering an optical network terminal, including a power adapter connected to the optical network terminal and configured to power the optical network terminal; and a battery tray, connected to the power adapter, configured to supply auxiliary power to the optical network terminal through the power adapter from one or more batteries contained within the battery tray, wherein the battery tray is configured to allow removal and replacement, at the customer premise, of the one or more batteries.

20 Claims, 7 Drawing Sheets

AUXILIARY POWER SYSTEM FOR OPTICAL NETWORK TERMINAL

BACKGROUND INFORMATION

Battery backup units (BBUs) can be used in conjunction with optical power supply units (OPSUs) to power optical network terminals (ONTs) at customer premises. Such arrangement provides backup power to the ONTs in the event of a power outage of the power grid serving the customer premises. Typically, during normal operation, an ONT may receive power from the power grid. However, during power outage of the power grid, such as during a natural disaster, brown out, etc., the BBUs may supply power to the ONTs. In situations where the ONTs supply voice service to the customer premises, the BBUs are needed to supply the power to maintain the voice service for a period of time. In these various scenarios for backup power, the continual servicing and maintenance can be rather expensive and complex for service providers.

Based on the foregoing, there is a need for an approach that can provide auxiliary power more cost-effectively, facilitate ease of maintenance, and provide increased power support times. In addition, a need has been identified which would allow the customers to determine their own need for power based on usage choices and based on readily available batteries with familiar form factors to allow customers to maintain their own backup power system.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
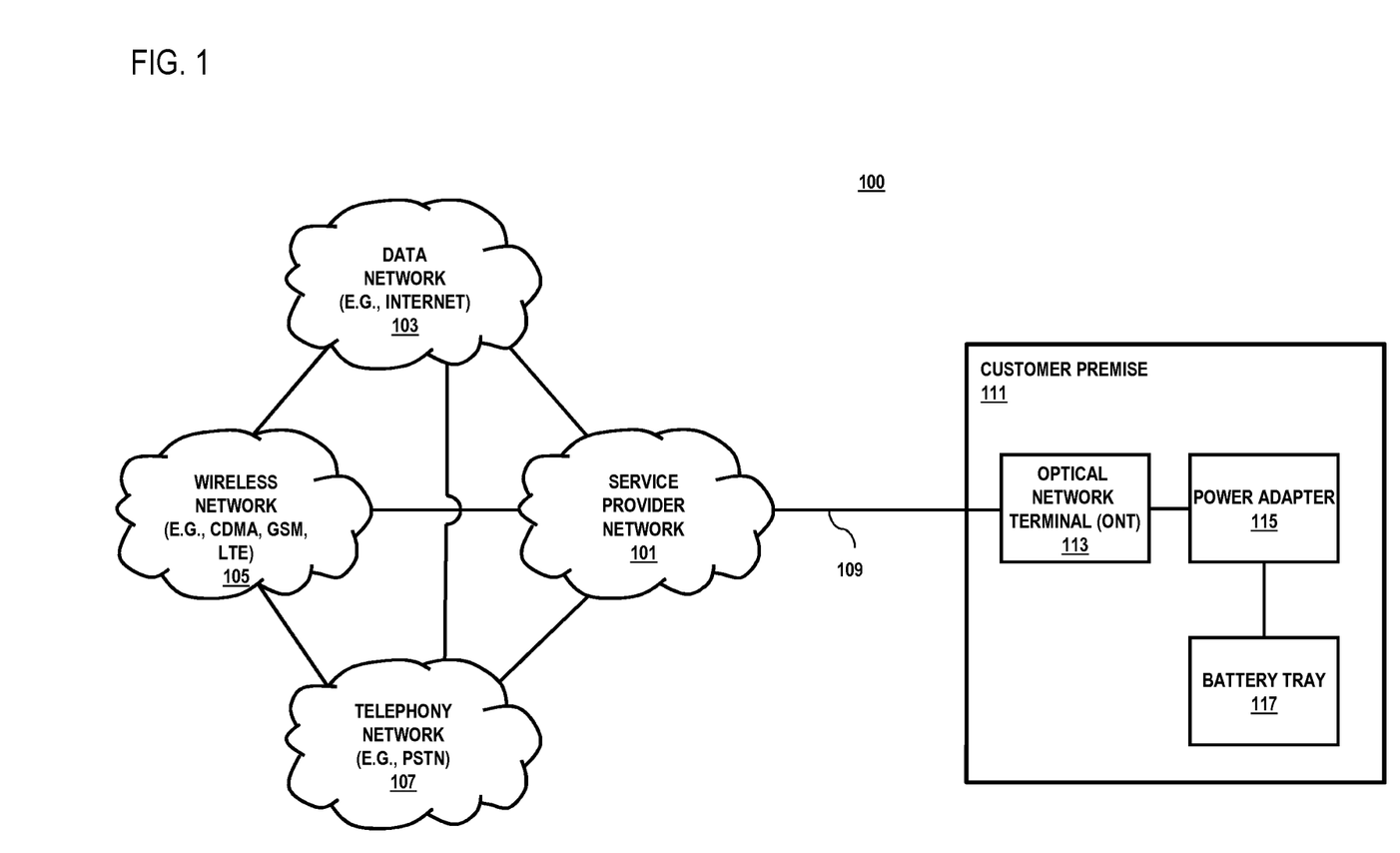
FIG. 1 is a diagram of a system capable of providing auxiliary power to an ONT from a battery tray, according to an exemplary embodiment.

FIG. 1 is a diagram of a system 100 capable of providing auxiliary power to an ONT from a battery tray 117, according to an exemplary embodiment. The system 100 may include one or more networks, such as a service provider network 101, a data network 103 (such as the Internet), a wireless network 105, and a telephony network 107. A service provider may provide one or more services to a customer premise 111 by way of a cable 109 to the service provider network 101.

In certain embodiments, the cable 109 may be, in part, an optical fiber connection that requires an ONT 113 at the customer premise 111. Thus, the customer premise 111 connects to the service provider network 101 through the ONT 113 over the cable 109. The ONT 113 may provide the services of the service provider at the customer premise 111, such as voice service, data service, video service, etc. For power, the ONT 113 is electrically connected to a power adapter 115 that supplies power from the power grid to the ONT 113, such as from an outlet within the customer premise 111. During a power outage, the power adapter 115 supplies auxiliary power from a battery tray 117 to the ONT 113.

Rather than the arrangement illustrated in FIG. 1, conventionally a BBU in conjunction with an OPSU, or a universal power supply (UPS) with an integrated backup battery, supply power to an ONT. For example, a BBU can include a 12-volt rechargeable battery connected to the OPSU, providing up to 8 hours of auxiliary power and typically requiring replacement every 2 to 6 years. The BBU may also include a status panel that provides information regarding the status of the 12-volt rechargeable battery. The information may include when the battery is supplying backup power to the ONT (e.g., on-battery control signal), if the battery is missing, when to replace the battery, battery level indicator, etc. The BBU through the status panel can provide visual and/or audio alerts regarding the condition of the 12-volt rechargeable battery, such as providing an audible alarm when the battery needs to be replaced. The information can also be provided to the ONT, and the ONT can provide the information to the service provider.

When installing an ONT at a customer premise, the service provider of the ONT typically sends a technician to the customer premise to install the BBU and OPSU because the BBU and OPSU are part of the network-installed equipment. Moreover, upon failure of the OPSU and/or BBU, the service provider must again send a technician to the customer premise to replace the BBU and/or OPSU. Drop shipment of replacement BBUs and/or OPSUs is typically not an option, as a customer may not have the necessary technical skills to install either device and as costs associated with replacing the BBU and/or OPSU may be prohibitively expensive. For example, there are significant costs associated with replacing the 12-volt rechargeable batteries, including both shipping costs and costs for disposing of the batteries. Commonly, the 12-volt rechargeable battery is a lead acid battery, which may also raise environmental concerns.

According to the system 100, however, a customer can have greater control over the auxiliary power that is supplied from the battery tray 117 through the power adapter 115 to the ONT 113 as compared to a BBU and an OPSU. Rather than the 12-volt rechargeable battery within BBUs, the battery tray 117 allows customers to use conventional, common batteries, such as standard D cell alkaline batteries.

Further, if the customer requires additional power after batteries within the battery tray 117 are depleted, such as during a long power outage, the customer may simply remove the depleted batteries and install new batteries.

Further, some BBUs are designed to maintain backup power during a power outage until the battery within the BBU is fully depleted. This design can be unfavorable during long power outages because the customer has no control over the depletion of the backup battery, which may result in the loss of backup power before restoration of power from the power grid. The system 100 does not suffer from the above issue because a customer has full control over auxiliary power supplied by the battery tray 117. As described above, the customer may replace depleted batteries as necessary. Further, as discussed in detail below, the battery tray 117 can include a manual power switch that allows the customer to turn auxiliary power supplied by the battery tray 117 on and off. Thus, the customer can turn the battery tray 117 on and off as power is needed for the ONT 113. Accordingly, the system 100 affords a customer greater control and flexibility in terms of supplying auxiliary power to an ONT 113 in the event of a power outage at the customer premise.

For illustrative purposes, the networks 101-107 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 105 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), 3G, 4G (e.g., Long Term Evolution (LTE)), etc., as well as any other suitable wireless medium, e.g., microwave access (WiMAX), wireless fidelity (WiFi), satellite, and the like. Meanwhile, data network 103 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 101-107 may be completely or partially contained within one another, or may embody one or more of the aforementioned infrastructures. For instance, the service provider network 101 may embody circuit-switched and/or packet-switched networks that include facilities to provide for transport of circuit-switched and/or packet-based communications. It is further contemplated that networks 101-107 may include components and facilities to provide for signaling and/or bearer communications between the various components or facilities of system 100. In this manner, networks 101-107 may embody or include portions of a signaling system 7 (SS7) network, or other suitable infrastructure to support control and signaling functions.

According to exemplary embodiments, end user devices (not shown) may be utilized to communicate within system 100 and may include any customer premise equipment (CPE) capable of sending and/or receiving information over one or more of networks 101-107. For instance, a voice terminal for communicating over the telephony network 107 may be any suitable plain old telephone service (POTS) device, facsimile machine, etc., whereas a mobile device (or terminal) for communicating over the wireless network 105 may be any cellular phone, radiophone, satellite phone, smart phone, wireless phone, or any other suitable mobile device, such as a personal digital assistant (PDA), pocket personal computer, tablet, customized hardware, etc. Further, a computing device for communicating over the data network 103 may be any suitable computing device, such as a VoIP phone, skinny client control protocol (SCCP) phone, session initiation protocol (SIP) phone, IP phone, personal computer, softphone, workstation, terminal, server, etc. Further, one or more of such end user devices at the customer premise 111 may be connected to the service provider network 101 through the ONT 113.

Figure 2:
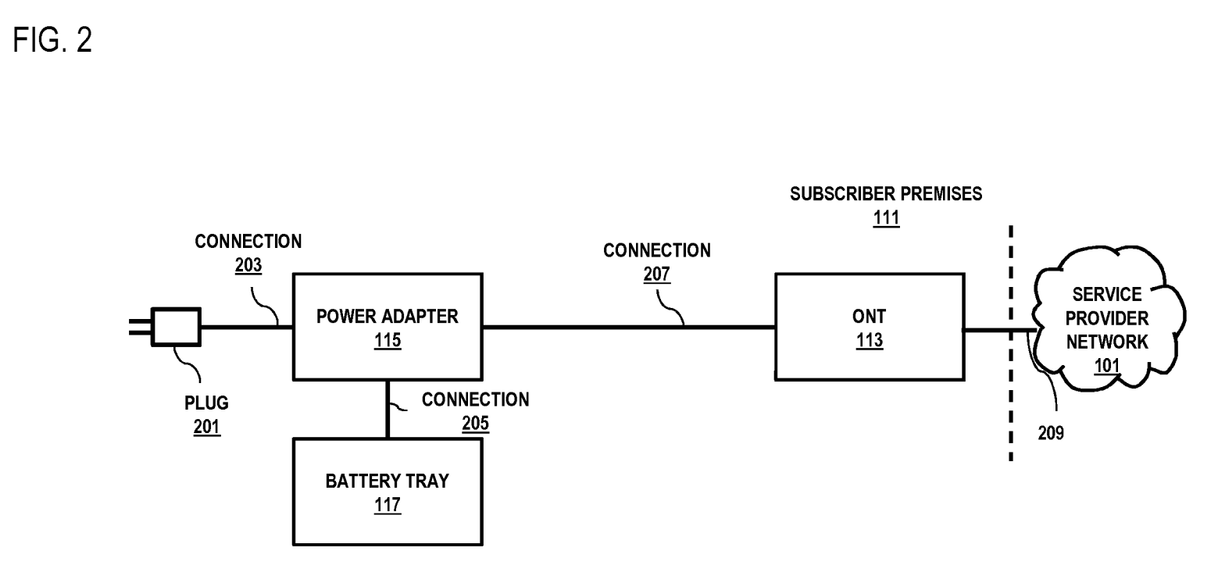
FIG. 2 is a diagram of an auxiliary power system for ONTs, according to an exemplary embodiment.

FIG. 2 illustrates a detailed arrangement for providing power, including auxiliary power, to an exemplary ONT. A plug 201 connects to the power grid through an outlet within the customer premise 111. The plug 201 may be a 2-prong flat plug that accepts 110 or 240 volts of alternating current. According to the plug 201 constituting a 2-prong flat plug, the plug 201 is more versatile than conventional ONT power supplies that require 3-prong plugs by being able to connect to 2 or 3-hole outlets. The plug 201 connects to the power adapter 115 through a cable 203. Typically, based on the electrical configuration of the power adapter 115, the cable 203 is up to 8 feet long and can be, for example, a conventional power cord.

The power adapter 115 connects to the battery tray 117 by a cable 205. The cable 205 may be up to 20 feet long and may be, for example, a coaxial power cable. According to the cable 205 being 10 feet long, the battery tray 117 may be located far from the power adapter 115 to allow for versatile arrangements, such as where the power adapter 115 is outside (e.g., within a GR-487 approved cabinet) and the battery tray 117 is inside at a customer premise 111. In one embodiment, the battery tray 117 may be optional. By making the battery tray 117 optional, customers of the service provider that do not need auxiliary power do not need to purchase or rent the battery tray 117 from the service provider.

The power adapter 115 connects to the ONT 113 by a cable 207. In exemplary embodiments, the power adapter 115 outputs power to the ONT 113 at 16 volts direct current and 25 Watts. In such case, the cable 207 can be up to 100 feet long, which also allows for versatile arrangements of the power adapter 115 with respect to the ONT 113. Thus, the power adapter 115 does not need to be within the immediate vicinity of the ONT 113. The output of power to the ONT 113 at 16 volts direct current and 25 Watts also makes the power adapter 115 compatible with current and legacy ONT power requirements. According to the above configuration, the power adapter 115 can supply power from the power grid to the ONT 113. During an outage of power from the power grid, the power adapter 115 can supply auxiliary power to the ONT 113 from the battery tray 117. Further, the battery tray 117, as opposed to a BBU with a fixed backup battery, affords a customer greater control over the auxiliary power supplied to the ONT 113 by allowing the customer to replace batteries as needed and manually control the supplied auxiliary power using a manual power switch on the battery tray 117.

The approach of the system 100 and the configuration illustrated in FIG. 2 stems, in part, from the desire to simplify the configuration and allow customers to have more control over the auxiliary power. Moreover, based on the simplicity of the design, the battery tray 117 can be drop-shipped to the customer. The customer can also determine and implement their own power needs by being able to replace batteries and manually control power from the battery tray 117. The use of readily available batteries with a familiar form factor affords the customer the freedom to maintain their own backup power system.

Figure 3:
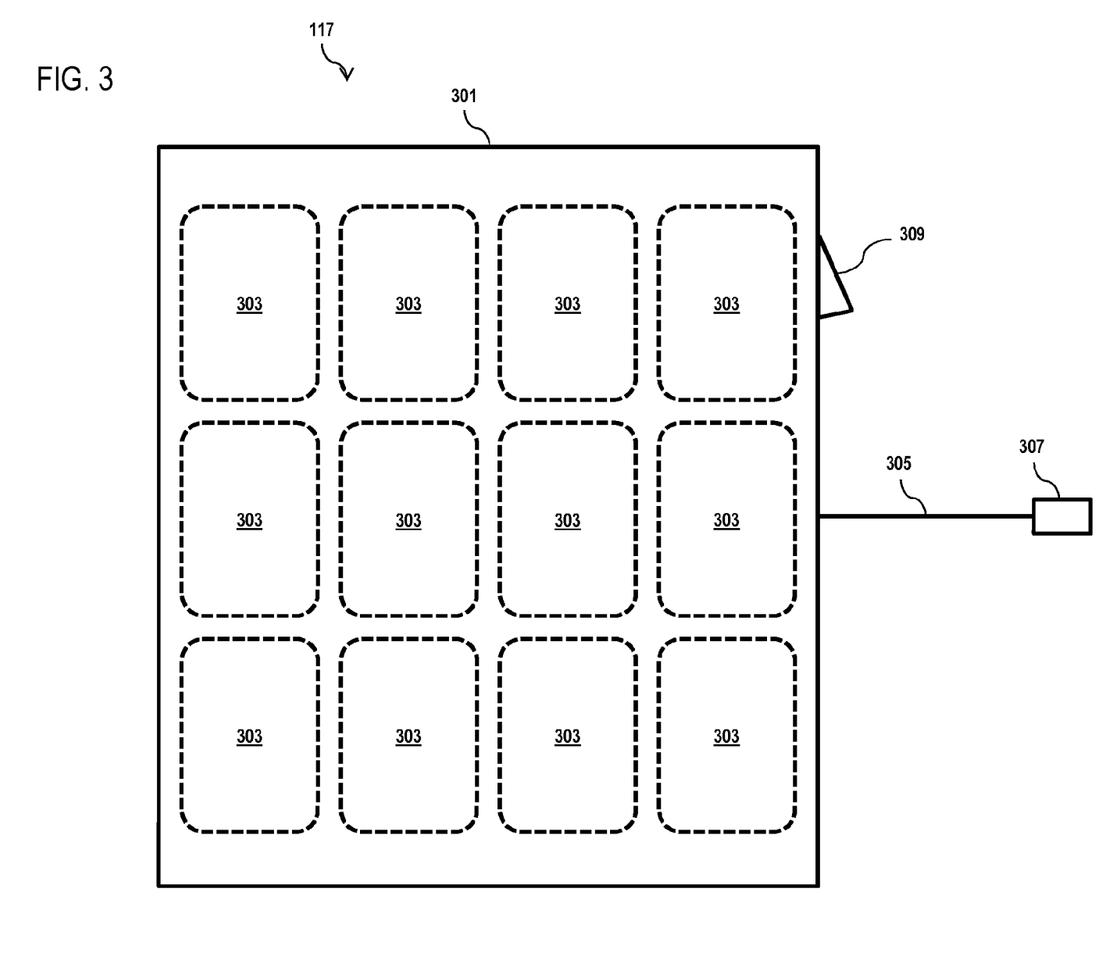
FIG. 3 is a diagram of a battery tray for providing auxiliary power to an ONT, according to an exemplary embodiment.

FIG. 3 is a diagram of the battery tray 117 for providing auxiliary power to a power adapter 115 and an ONT 113, according to an exemplary embodiment. Although referred to throughout as a battery tray, the battery tray 117 may alternatively be referred to as a power reserve, a battery backup, a power reserve tray, a battery backup tray, etc. Also, it will be understood that the tray 117 can be alternately constructed and referred to as a compartment, a holder, a housing, a pack, a panel, a unit, etc., as appropriate. The battery tray 117 may include a tray 301 that is electrically configured to accept 12 batteries within battery slots 303. As one example, the battery tray 117 can be configured to accept 12 D cell batteries. However, the number and batteries used may vary, such that the battery chemistries may be nickel-cadmium, lithium-ion, alkaline, etc., and the battery types may be 4.5 volts, 9 volts, D cell, C cell AA, AAA, etc. For example, the battery tray 117 may be configured to accept 16 D cell alkaline batteries. However, the battery tray 117 is configured to allow a customer to remove and replace one or more batteries, using batteries having a familiar form factor. Thus, the one or more batteries within the battery tray 117 are common, off-the-shelf batteries that are readily available in retail stores, rather than a specialty battery that a consumer cannot readily find and purchase, such as a 12-volt rechargeable battery found in BBUs.

The battery tray 117 further includes a cable 305, such as a coaxial power cord, to connect the tray 301 to a power adapter 115. The end of the cable 305 may include a connector 307, such as a coaxial power connector, for connecting the battery tray 117 to a power adapter 115. The cable 305 can be 20 feet long allowing for versatile arrangements of the power adapter 115 and the battery tray 117. The battery tray 117 can also be designed to store or hold an unused length of the cable 305 (not shown for illustrative convenience).

In one embodiment, a BBU and/or a UPS may include an auxiliary power interface that accepts a connection for providing auxiliary power to the BBU and/or UPS. For example, the BBU and/or UPS auxiliary power interface may accept a connection from a 12-volt cigarette lighter plug from a vehicle. Where the BBU and/or UPS includes an auxiliary power interface, the battery tray 117 can connect to the BBU and/or UPS auxiliary power interface as an auxiliary power source in addition to the backup battery within the BBU and UPS through cable 305. One or more converters can be connected to the connector 307, as necessary, to connect the cable 305 to the auxiliary power interface of the BBU and/or UPS.

The battery tray 117 may further include a switch 309. The switch 309 allows for manual control of the battery power supplied to a power adapter 115 by a customer. For example, while switched to an OFF position, the switch 309 prevents the supply of power from batteries within the battery tray 117 to a power adapter 115. In an ON position, the switch 309 allows the supply of power from batteries within the battery tray 117 to a power adapter 115. Thus, although a power adapter 115 connected to the battery tray 117 may include an automatic switch for switching between grid power and auxiliary power in the event of a power outage, the switch 309 allows a customer at a customer premise 111 to control when power is supplied from the battery tray 117. For example, during a long power outage, a customer at a customer premise 111 may selectively turn the battery tray 117 on and off by way of the switch 309 to provide power to an ONT as needed, rather than constantly during the outage causing the batteries to be unnecessarily depleted.

Figure 4A:
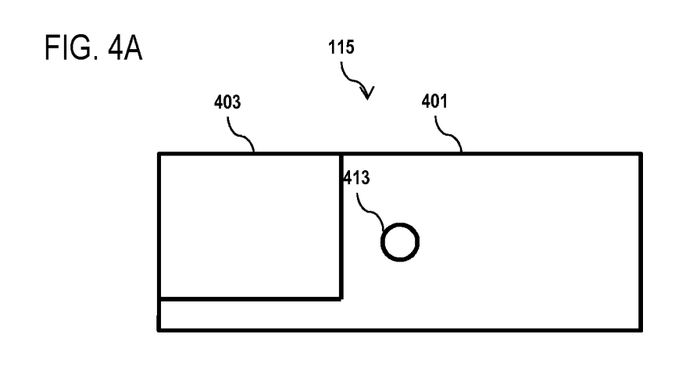
FIGS. 4A through 4C are diagrams of a power adapter configured to supply power to an ONT, according to an exemplary embodiment.
Figure 4B:
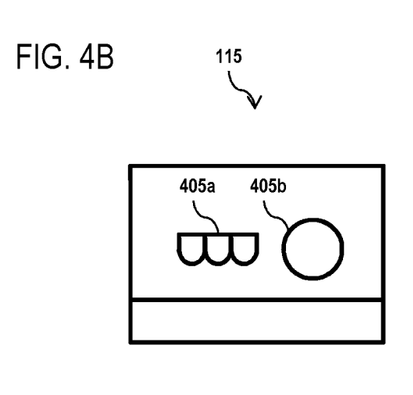
Figure 4C:
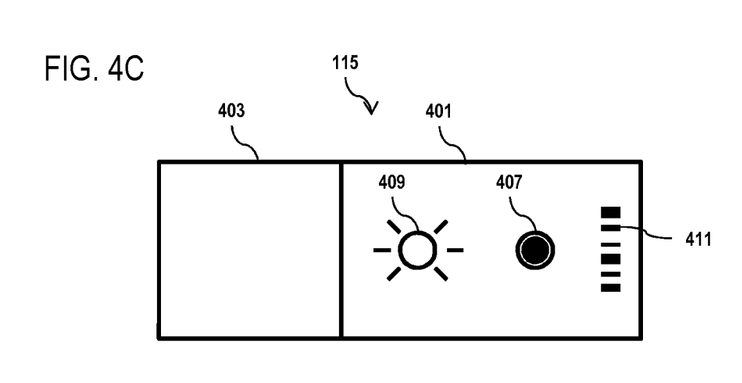

FIGS. 4A through 4C are diagrams of the power adapter 115 configured to supply power to an ONT, according to an exemplary embodiment. Specifically, FIG. 4A illustrates a side view of the power adapter 115, FIG. 4B illustrates an end view of the power adapter 115, and FIG. 4C illustrates a top-down view of the power adapter 115. As discussed above, the power adapter 115 is a single piece power supply. The power adapter 115 can provide power to an ONT (such as ONT 113) at 16 volts and 25 Watts. This voltage and wattage allows the power adapter 115 to provide power to an ONT at a greater distance than conventional ONT power supplies, such as a conventional OPSU/BBU arrangement that is typically limited to 50 feet. With the voltage and wattage of 16 volts and 25 Watts, respectively, the power adapter 115 allows for more robust electrical characteristics than conventional ONT power supplies, which primarily only deliver 12 volts at lower wattages. Moreover, the power adapter 115 may be built using more robust electrical components such that the power adapter 115 withstands increased surge protection of up to 12 kV. The power adapter 115 also provides for the safe removal of alternating current power if the surge suppression device becomes inoperative and the power adapter 115 enters a thermal run-away condition. The power adapter 115 can also be constructed with increased operating temperature ranges, which can be the same as the operating temperature ranges of an ONT so that the power adapter 115 can be placed near the ONT, such as outside.

The power adapter 115 further comprises an internal automatic switch (not shown for illustrative convenience) to switch over to an auxiliary power supply, such as a battery tray 117, in the event of a loss of power supplied by the power grid. The automatic switch allows the power adapter 115 to resume supplying power to an ONT from the power grid once power is restored. During supply of power from the power grid, the power adapter 115 does not draw power from the battery tray 117, or draws only minimal power through parasitic drain. Further, the power adapter 115 does not provide power to the battery tray 117 for a simplified design. However, in one embodiment, during supply of power from the power grid, the power adapter 115 can supply power to the battery tray 117 to recharge batteries within the battery tray 117. In such an embodiment, the customer can use rechargeable batteries in the battery tray 117 rather than non-rechargeable batteries.

The power adapter 115 includes a main body 401 and an end cap 403. The end cap 403 covers an end of the power adapter 115 that accepts a power supply connection to an ONT. FIG. 4B illustrates the power adapter 115 with the end cap 403 off, exposing two interfaces for connecting the power adapter 115 to an ONT. As illustrated in FIG. 4B, the power adapter 115 can include two interfaces 405a and 405b for connecting to an ONT. The interfaces 405a and 405b may be a legacy 3-screw terminal interface 405a for use with 16-gauge cable or a DIN connector interface 405b. Although only two interfaces are illustrated in FIG. 4B, the power adapter 115 may have only one interface, or may have more than two interfaces, and the interface type may vary depending on the model of ONT to connect to the power adapter 115. Thus, the type of interface allows the power adapter 115 to connect to newer model ONTs or legacy ONTs, as needed depending on the requirements of the customer premise.

Further, the power adapter 115 may include a thermal sensor that allows the power adapter 115 to turn off in the event of overheating.

Legacy ONTs and BBUs typically have various indicators and/or alarms to provide the customer and/or service provider information regarding the status of the battery (e.g., 12-volt rechargeable battery) within the BBU. The indicators and/or alarms may include on-battery indicator, missing battery indicator and/or alarm, low battery indicator and/or alarm, and replace battery indicator and/or alarm. For example, a BBU may generate an alarm when the 12-volt rechargeable battery within the BBU is missing, almost depleted, or needs to be replaced. The OPSUs and/or BBUs designed to connect to ONTs can send the alarms to the ONTs regarding the battery information, in addition to an on-battery control signal that informs the ONT that power is being supplied from a backup battery. The ONT can then forward the alarms to the service provide to alert the service provider to conditions of the battery, such as the need for a technician to service the BBU to replace an old or defective 12-volt rechargeable battery.

Because of the simplicity of the power adapter 115, the arrangement of the power adapter 115 and battery tray 117, and the freedom of the customer to control the batteries within the battery tray 117, the power adapter 115 is not provided and/or cannot detect the above conditions with respect to the batteries within the battery tray 117, except for the on-battery condition when power is being supplied from the battery tray 117. Thus, the power adapter 115 does not provide the alarms to the ONT 113. To avoid an ONT 113 from being in a constant condition of alarm, however, the connection between the ONT 113 and the power adapter 115 can be shorted. For example, the cable 207 can have one or more pins shorted to prevent the ONT 113 from being in a condition of alarm, such as by having DIN cable ends with battery missing alarm and low battery alarm shorted.

Besides the connection between the ONT 113 and the power adapter 115 being shorted, in one embodiment, the power adapter 115 can alternatively be configured to provide signals to the ONT 113 to prevent one or more conditions of alarm. Although the power adapter 115 does not receive information regarding the condition of the batteries, the power adapter 115 can provide signals that do not indicate the actual condition of the batteries within the battery tray 117 but merely prevent the alarm conditions at the ONT 113. The signals may be hardware based, software based, or firmware based.

Although not shown (for illustrative convenience), the end opposite from the end cap 405 may include a cable (e.g., cable 203) connecting the power adapter 115 to a wall outlet within the customer premise 111 for connecting the power adapter 115 to the power grid. As described with respect to FIG. 2, the plug (e.g., plug 201) for the power adapter 115 may be a 2-prong flat plug that is compatible with most wall outlets in customer premises, rather than a 3-prong plug that requires a ground or Earth line. Further, the power adapter 115 may be constructed such that the power adapter 115 is compatible with 240-volt alternating current outlets, rather than 110 or 120-volt alternating current outlets. By being compatible with higher voltage outlets, the power adapter 115 can be connected to the power grid through a larger number of outlets at a customer premise.

As illustrated in FIG. 4C, the power adapter 115 may further have a reset switch 407 for sending a reset signal to an ONT. The reset switch 407 allows the customer to reset the ONT 113 rather than a service provider. The power adapter 115 can also include an indicator 409 for indicating when the power adapter 115 is operating correctly and supplying power to the ONT 113. By way of example, the indicator 409 may be a light-emitting diode (LED), which uses only a small amount of energy. If the indicator 409 is off and the customer premise 111 does not have power from the power grid, the indicator 409 also indicates the batteries within the battery tray 117 have been depleted and need to be replaced. Otherwise, the customer can detect the level of the batteries according to other methods, such as by using a battery tester strip, a battery tester, or a Volt Meter by removing and individually testing the batteries. The power adapter 115 may further include an indicator 411 in the form of human-readable and/or machine-readable bar codes and/or serial numbers for logging and tracking the specific power adapter 115 used at a customer premise by the service provider.

On one side of the power adapter 115 is an interface 413 for receiving a connection from a battery tray 117. The interface 413 may be any type of interface that can accept power from the battery tray 117, such as a coaxial power connector. To further simplify the design of the power adapter 115, both alone and in conjunction with the battery tray 117, the interface 413 need only be able to draw power from a battery tray 117 and not also supply power to the battery tray 117, such as during operation of the power adapter 115 using power from the power grid. However, in one embodiment, the interface 413 can be configured to also supply power to the battery tray 117 to allow the customer to use and recharge batteries in the battery tray 117.

Figure 5:
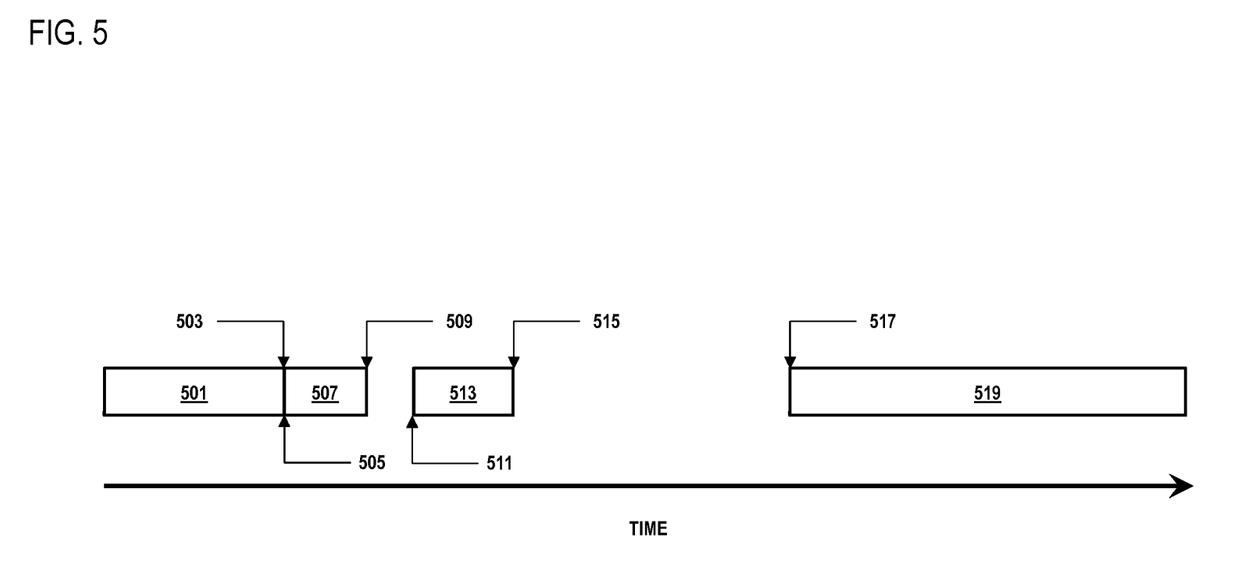
FIG. 5 is a timing diagram for providing auxiliary power to an ONT in the event of loss of power from a power grid, according to an exemplary embodiment.

FIG. 5 is a timing diagram for providing auxiliary power to an ONT in the event of loss of power from a power grid, according to an exemplary embodiment. Moving from left to right across FIG. 5 represents the passing of time. At period 501, normal power operation is occurring such that an ONT at a customer premise 111 is being supplied power from a power grid from a power adapter 115.

At point 503, the power grid at the customer premise 111 experiences an issue such that the customer premise 111 experiences a power outage. An automatic power switch within the power adapter 115 automatically switches from the power grid to auxiliary power supplied by the battery tray 117, if the battery tray 117 connected to the power adapter 115 is switched to an ON state, as represented by point 505. At point 505, the power adapter 115 also provides an on-battery control signal to notify the ONT 113 that power is being supplied from the battery tray 117. Although treated as different points, point 503 and point 505 may be treated as substantially the same point in time such that the ONT 113 does not experience a loss of power despite the power outage and switchover to auxiliary power.

During period 507, auxiliary power operation occurs such that the ONT 113 at a customer premise 111 is supplied power from a battery tray 117 that is connected to a power adapter 115. To conserve power provided by the battery tray 117, the customer at the customer premise 111 may decide to switch off the battery tray 117 using the external power switch 309. Thus, point 509 may represent the customer turning off the battery tray 117. At which point, power is no longer provided to the ONT 113 and, therefore, the ONT 113 turns off. The user may decide to conserve power for various reasons, such as the user not expecting to use voice services provided by the ONT 113. Therefore, to conserve power for when the customer wants to use voice service, the customer may turn off the battery tray 117.

At point 511, the customer may decide to use the voice service provided by the ONT 113 again, such as the customer wanting to make a telephone call. Thus, the customer may manually switch the power switch on the battery tray 117 to ON. At point 511, auxiliary power is restored to the ONT 113 from the battery tray 117 and through the power adapter 115. During period 513, the customer may again use the services provided by the ONT 113. Later, such as at point 515, if the customer no longer wants to use the services provided by the ONT 113, the customer may again turn off the battery tray 117 using the manual switch 309 to conserve power. Thus, at point 515, no power is provided to the ONT 113.

Eventually, power provided by the power grid is restored to the customer premise 111, as represented by point 517. Thus, period 519 represents normal power operation of the ONT 113 as provided by the power adapter 115 from the power grid.

Although only period 507 and 513 are illustrated and described with respect to auxiliary power being provided to the ONT, the illustrated and discussed embodiment is not meant to be limiting. Depending on the length of the power outage, one continuous period may exist between loss of power and resumption of power supplied by the power grid to the ONT 113 during which auxiliary power may be supplied to the ONT 113 from the battery tray 117. Further, multiple periods may exist between the loss of power and resumption of power supplied by the power grid representing the customer turning the manual power switch 309 of the battery tray 117 on and off. Further, the multiple periods may represent the customer replacing the batteries within the battery tray 117 to maintain auxiliary power supplied to the ONT 113 depending on the length of the power outage. For example, if the power outage lasts for a week, the customer may replace the batteries within the battery tray 117 one or more times depending on the usage of the auxiliary power. Further, depending on the batteries used by the customer in the battery tray 117, the battery tray 117 may provide up to 25 to 30 hours of auxiliary power before the batteries are depleted and need to be replaced. Further, although the batteries within the battery tray 117 are not charged during periods of power being supplied to the ONT 113 from the power grid, the customer can use rechargeable batteries within the battery tray 117 that are recharged by other means, such as a separate battery charger. However, as discussed above, in the embodiment where the power adapter 115 can recharge batteries within the battery tray 117, the customer may use rechargeable batteries within the battery tray 117.

Figure 6:
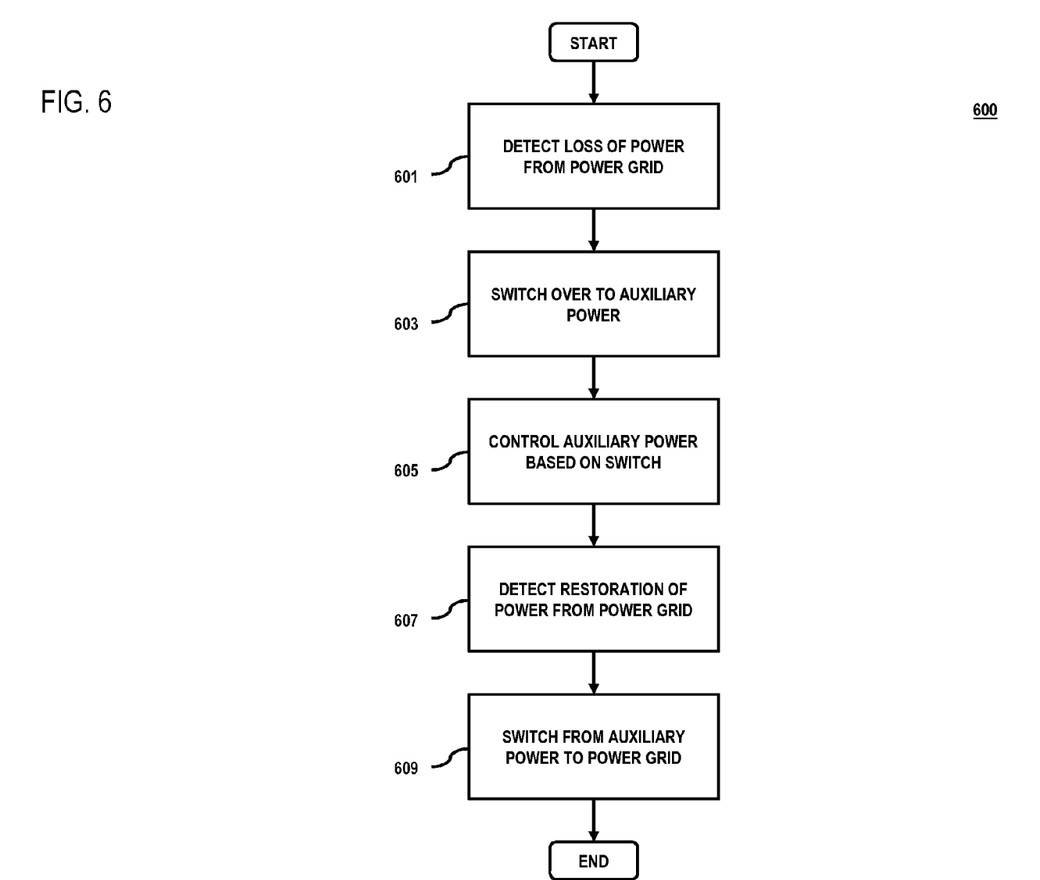
FIG. 6 is a flowchart for providing power to an ONT at a customer premise, according to an exemplary embodiment.

FIG. 6 is a flowchart for providing power to an ONT at a customer premise, according to an exemplary embodiment. Although illustrated and described with respect to a specific order, the order of steps of process 600 may change without departing from the scope of the disclosure.

The process 600 begins at step 601 with a power adapter 115 detecting the loss of power supplied from the power grid. For example, a natural disaster, brown out, malfunction, etc. associated with the power grid may cause a customer at a customer premise 111 to lose power. In one embodiment, the loss of power may include the loss of power sufficient for the power adapter 115 to power the ONT 113 based solely on power from the power grid while not constituting a complete loss of power.

At step 603, after detecting the loss of power from the power grid, the power adapter 115 switches over to auxiliary power supplied by the battery tray 117. An automatic switch within the power adapter 115 causes the switch over to auxiliary power, as discussed above. The switch to auxiliary power can be sufficiently fast to prevent the ONT 113 from losing power, restarting, etc.

At step 605, a customer can manually control the supply of auxiliary power from the battery tray 117 to the power adapter 115 and ONT 113 by manually controlling the switch 309 on the battery tray 117. Thus, during a period of time during a power outage that a customer does not expect to use voice services over the ONT 113, the customer can manually actuate the switch 309 to an OFF position to prevent depletion of power from the batteries. During a period of time during a power outage that a customer desires to use voice services over the ONT 113, the customer can manually actuate the switch 309 to an ON position to resume auxiliary power to the ONT 113 or to maintain auxiliary power to the ONT 113. Thus, during an extended power outage, controlling the auxiliary power provided by the battery tray 117 according to switch 309 allows a customer to maintain charge within the batteries as needed, without replacing or recharging the batteries. The customer can also manually control the supply of auxiliary power from the battery tray 117 by removing and/or replacing the batteries within the battery tray 117. For example, the user may replace the batteries as needed to maintain auxiliary power during an extended power outage.

At step 607, the power adapter 115 detects the restoration of power from the power grid. Accordingly, at step 609, the power adapter 115 switches from supplying auxiliary power from the battery tray 117 to providing power from the power grid at the ONT 113, as caused by the automatic switch. The switch between power sources can be sufficiently fast to prevent the ONT 113 from losing power, restarting, etc.

Figure 7:
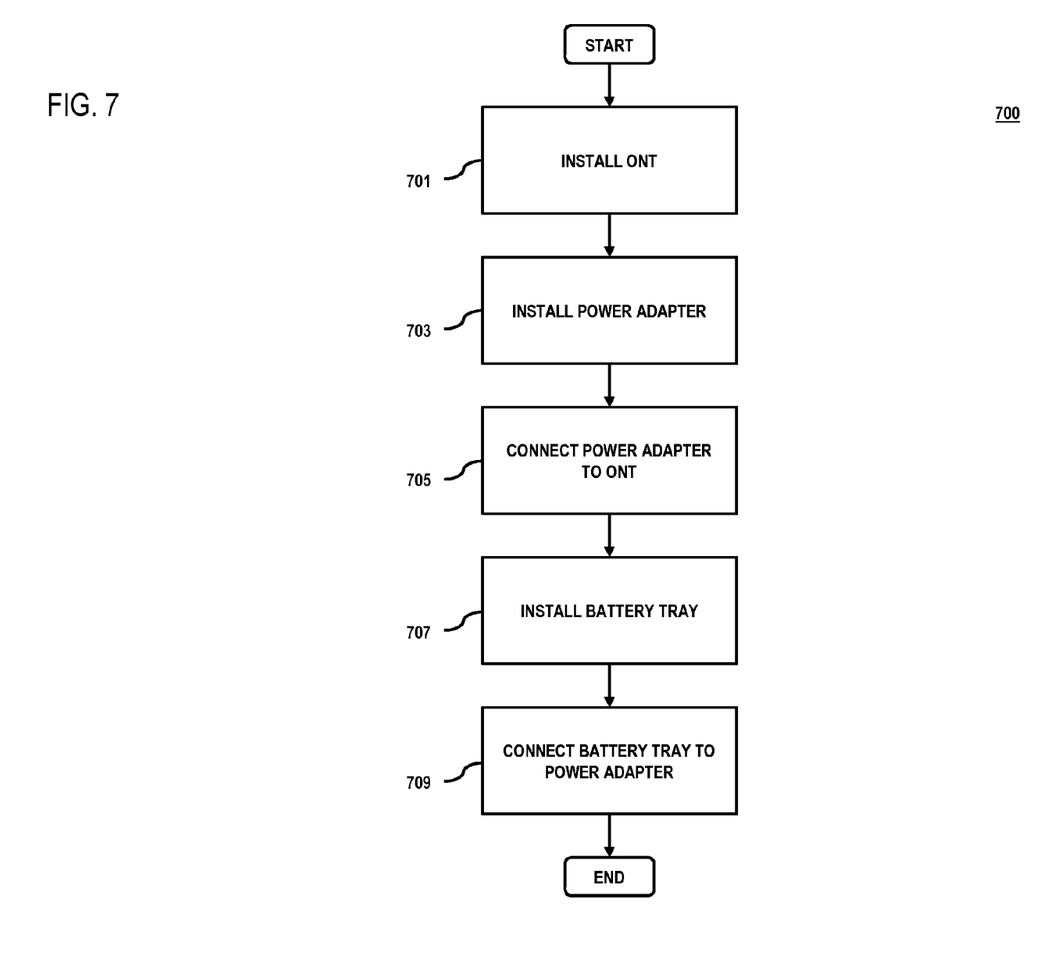
FIG. 7 is a flowchart for installation of a power adapter and battery tray at a customer premise, according to an exemplary embodiment.

FIG. 7 is a flowchart for installation of a power adapter and battery tray at a customer premise, according to an exemplary embodiment. Although illustrated and described with respect to a specific order, the order of steps of process 700 may change without departing from the scope of the disclosure.

The process 700 begins with the installation of an ONT 113 at a customer premise 111, at step 701. Because of the complexity of connecting an ONT 113 to a cable 109, typically a technician associated with a service provider installs the ONT 113 at a customer premise 111. As discussed above, the ONT 113 connects to cable 109, such as an optical fiber, to connect the ONT 113 to the service provider network 101. In one embodiment, the ONT 113 may already be installed at a customer premise 111. For example, when replacing an OPSU and BBU at a customer premise 111, the ONT 113 may have previously been installed at the customer premise 111 prior to installation of the power adapter 115. Thus, in one embodiment, step 701 may be optional in that the ONT 113 may already be installed at the customer premise 111.

At step 703, the power adapter 115 is installed at the customer premise 111. The power adapter 115 is typically installed near the ONT 113 and/or near an outlet at the customer premise 111 to simplify access to the ONT 113 and/or the power grid. Because of the electrical and mechanical characteristics of the power adapter 115, however, the power adapter 115 may be installed indoors or outdoors (e.g., when installed inside a GR-487 rated cabinet) as needed to connect to the ONT 113, which may be outdoors or indoors. Typically, the power adapter 115 is mounted or fixed to a surface within a customer premise 111 to make the power adapter 115 stable and partially permanent. Installation of the power adapter 115 may optionally include removal of a previously installed OPSU, BBU and/or UPS.

At step 705, the power adapter 115 is connected to the ONT 113. As discussed above, the cable 207 between the power adapter 115 and the ONT 113 may be one of various types of connections depending on the make and/or model of the ONT 113. In one embodiment, the cable 207 may be a 16-gauge wire connected to a 3-screw terminal interface. The cable 207 may alternatively be a DIN cable connected to a DIN interface. The cable 207 between the ONT 113 and the power adapter 115 may be up to 100 feet long, allowing for a more versatile arrangement as compared to conventional OPSU/BBU and/or UPS/BBU arrangements. During step 705, the power adapter 115 is also connected to a wall outlet at the customer premise 111 to connect the power adapter 115 to the power grid. Typically, a technician associated with a service provider installs both the ONT 113 and the power adapter 115. However, according to the simplicity of the power adapter 115, the power adapter 115 may be installed by the customer at the customer premise 111, such as by drop shipping the power adapter 115 (e.g., in the case of replacing an older power adapter 115); although installation of a power adapter 115 that replaces an OPSU is typically performed by a technician.

At step 707, the battery tray 117 is installed at the customer premise 111. Because of the ease of installation of the battery tray 117, typically the battery tray 117 is installed by the customer at the customer premise 111. Thus, the battery tray 117 can be drop shipped to the customer and does not require a technician for installation. The battery tray 117 can have a length of cable of approximately 20 feet for connecting the battery tray 117 to the power adapter 115. Further, for ease of access to the battery tray 117, the battery tray 117 can be installed in a convenient location for a customer to access the manual switch on the battery tray 117 (e.g., switch 309) to manually control the supply of auxiliary power to the power adapter 115 and ONT 113. Thus, while the ONT 113 and the power adapter 115 may be located outside, for example, the battery tray 117 can be located inside at the customer premise 111.

After installation, at step 709 the battery tray 117 is connected to the power adapter 115 by way of the cable 205, such as a coaxial power cable, and ready for providing auxiliary power to the ONT 113 in the event of a power outage experienced by the power grid. Thus, based on the ease and simplicity of process 700, particularly with respect to installing and connecting the power adapter 115 and battery tray 117, installing and maintaining the power adapter 115 and battery tray 117 is more cost-effective and facilitates ease of maintenance as compared to conventional OPSUs and BBUs.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A system comprising:
    an optical network terminal for receiving a service from a service provider external to a customer premise;
    a power adapter connected to the optical network terminal and configured to provide power, from a power grid, to the optical network terminal and, in response to a power shortage corresponding to the power grid, switch the providing of power from the power grid to auxiliary power; and
    a battery tray, connected to the power adapter, configured to supply the auxiliary power to the optical network terminal through the power adapter and from one or more batteries contained within the battery tray,
    wherein:
        the optical network terminal is configured to generate an alarm in response to receiving an indication of a power failure corresponding to the auxiliary power, and
        the power adapter is configured to communicate, to the optical network terminal, signals to prevent the optical network terminal from entering into an alarm condition associated with power shortages corresponding to the auxiliary power.

2. The system according to claim 1, wherein the connection from the battery tray to the power adapter is only for supplying the auxiliary power to the power adapter.

3. The system according to claim 1, wherein the power adapter powers the optical network terminal at 16 volts direct current and 25 Watts at a range of up to 100 feet range.

4. The system according to claim 1, wherein the power adapter comprises a two-prong plug for receiving grid power at up to 240 volts alternating current.

5. The system according to claim 1, wherein the battery tray comprises an external power switch for manually controlling supply of the auxiliary power to the power adapter.

6. The system according to claim 1, wherein the power adapter includes an indicator and a reset switch to reset the optical network terminal by the customer.

7. The system according to claim 6, wherein the indicator is a light emitting diode (LED) that indicates when power supplied from the battery tray is being provided to the optical network terminal during the power shortage.

8. The system according to claim 1, wherein the battery tray accepts 12 D cell batteries.

9. The method of claim 1, wherein the power adapter is configured to communicate the signal without receiving information regarding an actual condition of the auxiliary power.

10. A device comprising:
    an auxiliary power connector configured to accept an electrical connection from a battery tray;
    an electrical plug configured to accept an electrical connection from a power grid; and
    an optical network terminal connector configured to supply power to an optical network terminal,
    wherein the device is configured to communicate, to the optical network terminal, signals that prevent the optical network terminal from entering into an alarm condition associated with power shortages corresponding to batteries of the battery tray.

11. The device according to claim 10, further comprising:
    a reset switch for a customer of the device to reset the optical network terminal.

12. The device according to claim 10, further comprising:
    an indicator to indicate when power supplied from the battery tray is being provided to the optical network terminal during a power shortage.

13. The device according to claim 10, wherein the electrical connection from the power grid-comprises a two-prong electrical plug that accepts up to 240 volts alternating current.

14. The device of claim 10, wherein the device is configured to communicate the signal without receiving information regarding an actual condition of the batteries.

15. A method comprising:
    providing, by a power adapter, power from a power grid to an optical network terminal;

detecting, by the power adapter, a loss of power from a power grid;

supplying, by the power adapter and during the loss of power, auxiliary power to the optical network terminal from one or more batteries in a battery tray connected to the power adapter;

providing, by the power adapter and to the optical network terminal, signals configured to prevent the optical network terminal from entering into an alarm condition associated with power shortages corresponding to the auxiliary power, and providing, by the power adapter, the auxiliary power configured to the optical network terminal based on a manual power switch on the battery tray.

16. The method according to claim 15, further comprising:

detecting that power has returned to the power grid;

providing, to the optical network terminal, power from the power grid instead of the one or more batteries; and while providing the power, from the power grid, to the optical network terminal, using a portion of the power from the power grid to recharge the one or more batteries in the battery tray.

17. The method according to claim 15, wherein the power adapter is configured to communicate the signals without receiving information regarding an actual condition of the auxiliary power.

18. A power adapter, comprising:

a first interface configured to receive power from a power grid;

a second interface configured to receive power from an auxiliary power supply;

an internal switch to:

cause the power adapter to receive the power from the power grid when the power is available from the power grid, and when the power is not available from the power grid, cause the power adapter to receive the power from the auxiliary power supply; and a third interface configured to provide the power, from the power grid and the auxiliary power supply, to an optical network terminal, wherein, the power adapter is configured to communicate a signal, to the optical network terminal, to prevent the optical network terminal from entering into an alarm condition associated with power shortages corresponding to the auxiliary power supply.

19. The power adapter of claim 18, wherein the power adapter is configured to communicate the signal without receiving information regarding an actual condition of the auxiliary power supply.

20. The power adapter of claim 19, wherein:

when the power is again available from the power grid, the internal switch is configured to cause the power adapter to receive power from the power grid instead of the auxiliary power supply, and the power adapter is configured to use a portion of the power from the power grid to recharge the auxiliary power source.

* * * * *